H. S. WILDER.
KEYBOARD FOR PRACTICING AND TEACHING THE PLAYING OF THE PIANO.
APPLICATION FILED OCT. 20, 1919.

1,347,068. Patented July 20, 1920.

INVENTOR:
Henry Stapler Wilder
by Macleod, Calver, Copeland & Dike
Attys.

UNITED STATES PATENT OFFICE.

HENRY STAPLES WILDER, OF NEWTON, MASSACHUSETTS.

KEYBOARD FOR PRACTICING AND TEACHING THE PLAYING OF THE PIANO.

1,347,068.     Specification of Letters Patent.     Patented July 20, 1920.

Application filed October 20, 1919. Serial No. 331,919.

*To all whom it may concern:*

Be it known that I, HENRY STAPLES WILDER, a citizen of the United States, residing at Newton, county of Middlesex, State of Massachusetts, have invented a certain new and useful Improvement in Keyboards for Practicing and Teaching the Playing of the Piano, of which the following is a specification, reference being had therein to the accompanying drawings.

The invention relates to an improved keyboard for practicing and teaching the playing of the piano. The special object is to provide an inexpensive and small device with which to develop and to teach the two things which constitute so-called piano technique, namely "adjustment" and "quality of action."

The invention consists substantially in providing a keyboard of wood or other suitable material one or more octaves in length and of suitable width and depth on which, or a part of which, is a diagram or outline piano keyboard whose so-called black or chromatic keys, while immovable, may or may not be of the standard height and whose so-called white keys are formed as depressions or corrugations extending either a portion or the full length of said white keys and may be of varying depths and shapes.

The keyboard is also provided at each end with adjustable screws or other devices which may be so adjusted as to form pivots on the under side on which to balance or rock the keyboard at varying centers. When they are so adjusted, the front is normally raised above the table or other flat surface on which it is placed, while the rear edge rests on the table, the object being to provide a means for giving the effect of an active movement of the keys when struck or depressed by the fingers or hand, a thud being caused by the striking of the front of the keyboard on the table when the keyboard is struck by the fingers of the player, and a resultant thud being caused by the back side of the keyboard striking the table when the fingers or hand are released.

The invention will be fully understood from the following description when taken in connection with the accompanying drawings, and the novel features thereof will be pointed out and clearly defined in the claims at the close of this specification.

In the drawings, Figure 1 is a plan view of a keyboard embodying the invention.

Figure 1:
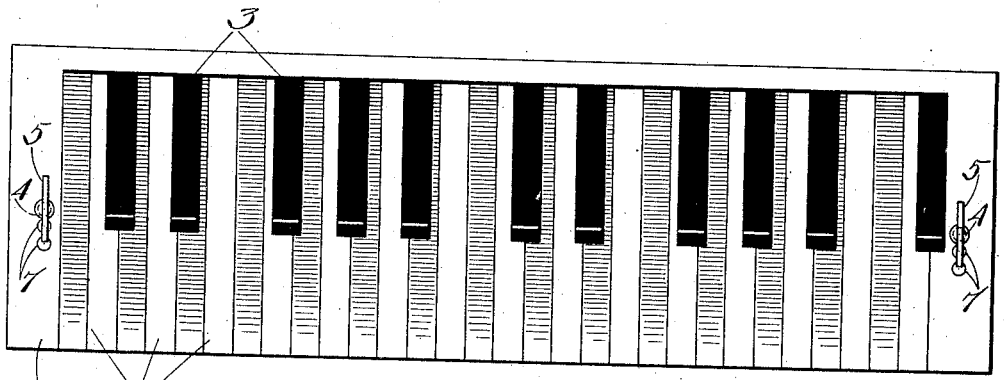
Figure 2:
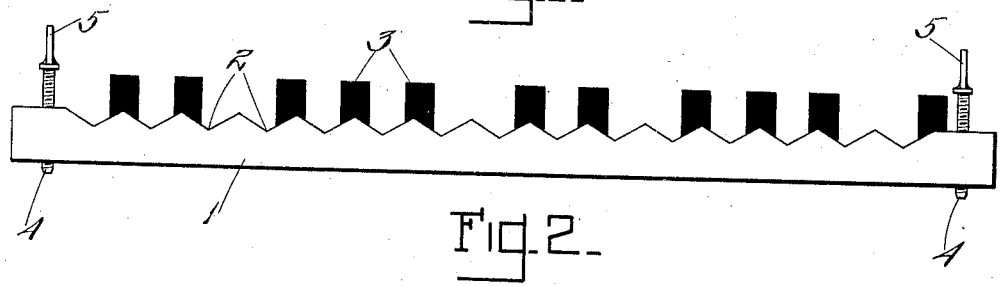
Fig. 2 is a front elevation of the keyboard shown in Fig. 1.
Figure 3:
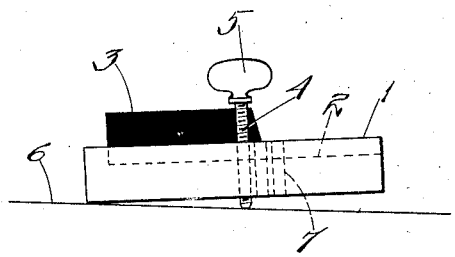
Fig. 3 is an end view showing the keyboard in its normal position with the rear edge resting on the table and the front edge raised.
Figure 4:
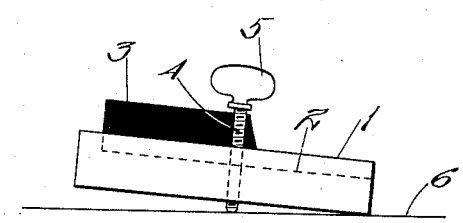
Fig. 4 is an end view showing the keyboard with the front edge resting on the table and the rear edge lifted as will be the case when the keyboard is depressed by the hand or fingers of the player.

Referring now to the drawings, 1 represents the keyboard which may be of any suitable length and width and thickness. On this board are represented dummy keys representing the ordinary white and black keys arranged in octaves. The ordinary white keys are represented by a series of depressions 2 in the upper surface of the board and which extend from the front edge rearwardly, the exact distance being immaterial. There are also provided elevated parts 3 which represent the ordinary black or chromatic keys of a piano keyboard suitably arranged and disposed with relation to the depressions 2 which represent the white keys as is usually the case on a piano keyboard.

These black keys 3 are shown as raised above the surface of the keyboard, but this is not essential.

The depressions 2 which represent the white keys are shown as broadly V-shaped, but the exact form of depression is immaterial. The ordinary white keys of the piano are depressible with relation to the keyboard itself, but in the device embodying the present invention, these depressions are in the board itself and therefore the said white key representations are not movable with relation to the board but are movable only bodily with the board, as will be hereinafter described.

For teaching "adjustment" so-called in the fingering of the keys of this invention, it is not necessary that the keys shall be depressed, as the corrugations provide a means for locating the individual keys. In order, however, to teach the "quality of action," that is, quickness of finger and hand movements, and the different qualities of touch such for instance as the legato, portamento, marcato and staccato, and also phrasing, it is important that there should be a movement of somewhat similar character to the movement of the movable white keys. To that end, the board 1 is provided with a plurality of pivots, preferably two in number, one at each end, located front of the center of gravity so that the back edge of the keyboard will normally rest on the table 6 and the front edge will be lifted. Any suitable form of pivots for this purpose may be employed, and any suitable device or lever may be provided for the varying leverages of the balancing devices. The form of pivots which are shown and described in the drawings are adjustable screws 4, 4, one at each end which pass through the keyboard from the upper to the lower side and are provided with finger pieces 5 so that they may be turned to draw them upwardly so they will not protrude on the underside when it is desired to have the board rest flat on the table while teaching "adjustment," and which may be turned so that the screws will project below the lower side of the board and thus form pivots when it is desired to have the board capable of being rocked during the teaching of the "quality of action."

By means of the depressions 2 properly spaced apart according to the spacing of the white keys of the piano, a simple and sure means is provided by which the correct finger and hand adjustment may be easily developed and taught. The pupil can easily find the keys represented by the depressions by the sense of touch while his eyes are focused elsewhere, and by setting up the screws so that they will serve as pivots and permit the board to be rocked, thus causing the direct and resultant thuds, the device furnishes a simple and sure means by which the "quality of action" and the different qualities of touch and phrasing may be easily taught, as already described.

It has been proved in actual experience that by associating a definite pitch with a definite visual key the development of so-called "musical thinking" is accomplished more rapidly on a dumb keyboard than on a speaking keyboard, because not hearing the pitch, students are more apt to think the pitch. Thus this important phase of musical development will be accomplished in the majority of cases more rapidly on a dumb keyboard than on a speaking keyboard.

When the screws are adjusted so as to protrude on the under side and form pivots, if the pupil strikes any one of the keys on the front side of the line of the pivots, as in striking a key, it will depress the front side of the keyboard causing a click or thud as the forward edge of the keyboard strikes the table, and it will also cause a resultant thud on the back side when the depression by the finger is released so that the forward side tips up and the back side strikes the table.

By holding the keyboard depressed while shifting from one finger to another on different keys or by the continued pressure of the same finger on the same key, the pupil will train the fingers to get the legato effect produced on the regular piano keyboard by a similar use of the fingers, and by a quick stroke and varying releases he will produce the portamento, marcato, and staccato effects.

It is desirable to have the pivots adjustable toward and from the center of gravity so as to vary the strength of stroke required for the rocking of the board. The nearer the pivot is to the center of gravity, the lighter the stroke required.

Any suitable means of adjustment may be employed. One means is to provide a plurality of screw holes 7 varying in distance from the center of gravity, into any one of which the screw pivot may be inserted.

Some of the advantages of this keyboard are its low cost, its small size, its lightness of weight, its easy adaptability to any flat or level surface, its convenience, its durability, and its upkeep, all of which make it easily and directly available for usage any where, either by individuals or in large or small classes.

What I claim is:—

1. A keyboard for practicing and teaching piano having formed therein a plurality of corrugations parallel with and spaced apart from each other in similar relation to each other as the white keys of a regular piano keyboard.

2. A keyboard for practicing and teaching piano having formed therein a plurality of corrugations parallel with and spaced apart from each other in similar relation to each other as the white keys of a regular piano keyboard and having disposed thereon a series of formations representing the chromatic keys of a regular piano keyboard disposed with relation to said depressions in the regular order of sequence of white and black keys of a keyboard.

3. A keyboard for practicing and teaching piano having formed therein a plurality of corrugations parallel with and spaced apart from each other in similar relation to each other as the white keys of a regular piano keyboard and having disposed thereon a series of formations representing the chromatic keys of a regular piano keyboard disposed with relation to said depressions in the regular order of sequence of white and black keys of a keyboard, said board being provided with pivots whereby when the keyboard lies on a flat surface the front edge will be raised above the supporting surface and the rear edge will rest on the supporting surface so that the keyboard may be rocked by the depressing of the front of the keyboard.

4. A keyboard for practicing and teaching piano having formed therein a plurality of corrugations parallel with and spaced apart from each other in similar relation to each other as the white keys of a regular piano keyboard and having disposed thereon a series of formations representing the chromatic keys of a regular piano keyboard disposed with relation to said depressions in the regular order of sequence of white and black keys of a keyboard, said board being provided with adjustable pivots in front of the center of gravity of the keyboard which may be adjusted to protrude below the under surface of the keyboard whereby when the keyboard lies on a flat surface the front edge will be raised above the supporting surface and the rear edge will rest on the supporting surface so that the keyboard may be rocked by the depressing of the front of the keyboard.

In testimony whereof I affix my signature.

HENRY STAPLES WILDER.